United States Patent [19]

Edgecomb et al.

[11] Patent Number: 4,842,010
[45] Date of Patent: Jun. 27, 1989

[54] LOCKING MECHANISM

[75] Inventors: Robert K. Edgecomb, Anderson, Ind.;
Maurice T. Rose, LaGrange, Ky.;
Rodney B. Smith, South Lyon, Mich.

[73] Assignee: General Motors Corporaion, Detroit, Mich.

[21] Appl. No.: 258,951

[22] Filed: Oct. 18, 1988

[51] Int. Cl.$^4$ ................................................ F16L 3/00
[52] U.S. Cl. ............................. 137/343; 251/129.15; 285/360; 74/606 R
[58] Field of Search ............ 74/606 R, 866; 137/343, 137/322; 251/143, 129.15; 285/360, 376, 401

[56] References Cited

U.S. PATENT DOCUMENTS

| | | | |
|---|---|---|---|
| 2,077,584 | 4/1937 | Rice | 285/376 |
| 3,065,885 | 11/1962 | Chatten | 137/322 |
| 3,645,562 | 2/1972 | Fadetti et al. | 285/360 |
| 4,159,102 | 6/1979 | Fallon et al. | 285/360 |
| 4,647,008 | 3/1987 | Shirai et al. | 251/129.15 |

Primary Examiner—A. Michael Chambers
Attorney, Agent, or Firm—Donald F. Scherer

[57] ABSTRACT

A locking mechanism for demountably securing a solenoid valve assembly within a receptacle in the wall of a transmission housing. A retention means is presented from the frame of the solenoid valve assembly cooperatively to interact with various blocking faces on a pillar means presented from the transmission housing and located adjacent to the receptacle. A stop lug, an engaging surface and a latching dog are each presented from the retention means. First, second and third blocking faces are presented from the pillar means. Engagement of the stop lug with the first blocking face limits the angular range through which the solenoid valve assembly may be rotated within the receptacle. When the stop lug engages the first blocking face, the engaging surface is disposed in opposition to the second blocking face to preclude withdrawal of the solenoid valve assembly from the receptacle. Engagement of the latching dog with the third blocking face normally precludes retro-rotation of the solenoid valve assembly within the receptacle. Biasing means permits selective displacement of at least the latching dog out of engagement with the pillar means to permit selective rotation, and retro-rotation, of the solenoid valve assembly within the receptacle to operate the locking mechanism.

6 Claims, 4 Drawing Sheets

LOCKING MECHANISM

TECHNICAL FIELD

The present invention relates generally to locking mechanisms for demountably attaching one article to another. More particularly, the present invention relates to a secure locking mechanism that can demountable attach one article to another without the use of screws or other similarly essential, but separate, mounting means. Specifically, the present invention relates to a locking mechanism that is particularly adapted for demountably securing a solenoid valve assembly to the housing of an electronically controlled automotive transmission.

BACKGROUND OF THE INVENTION

As is well known to the art, electronically controlled automotive transmissions are distinguished by the fact that the flow and pressure control valves which monitor, and selectively direct, the hydraulic fluid to the various control mechanisms of the transmission are actuated by solenoids. Individual solenoids and individual valves are often conjoined as a unitary assembly. Such unitary solenoid valve assemblies are generally employed: (1) to control the main fluid pressure within the transmission, (2) to establish the shift pressure for the transmission, as well as (3) to monitor the engine torque to establish the throttle position pressure, direct fluid pressure to or from the shift control valves.

Historically, the solenoid valve assemblies have been secured to the transmission housing by a plurality of individual fastening means. The transmission housing may include a separate control housing to which the solenoids are secured. Typically, the solenoid valve assemblies have been secured by snap rings, machine screws, or the like. Such mounting devices either secure a mounting flange presented from the solenoid frame to the transmission housing or secure a separate cap member which performs the functions of enclosing the solenoid to protect it from potentially deleterious exposure to the environment while simultaneously capturing and securing it in operative position on the transmission housing.

Such arrangements are, at best, time consuming and tedious to install and require a multitude of individual parts that are easily misplaced or lost.

SUMMARY OF THE INVENTION

It is, therefore, a primary object of the present invention to provide an improved locking mechanism which can be readily and easily employed demountably to secure a solenoid valve assembly to the housing of an electronically controlled automotive transmission.

It is a another object of the present invention to provide a locking mechanism, as above, a portion of which is relatively permanently secured to the solenoid valve assembly and the remaining portion of which is relatively permanently secured to the transmission housing so that the two portions of the locking mechanism can cooperatively interact demountably to secure a solenoid valve assembly to a transmission housing without the need to resort to the use of essential but separate components that can be misplaced or lost.

These and other objects of the invention, as well as the advantages thereof over existing and prior art forms, which will be apparent in view of the following detailed specification, are accomplished by means hereinafter described and claimed.

In general, a locking mechanism embodying the concepts of the present invention is adapted demountably to secure a solenoid valve assembly within a receptacle in the wall of a transmission housing. A retention means is relatively permanently secured to the solenoid valve assembly, and a stop means is presented from the retention means. A first blocking face is presented from the transmission housing to be engaged by the stop means and thereby to limit the angular range through which the solenoid valve assembly may be rotated within the receptacle.

The retention means also presents an engaging surface, and a second blocking face is presented from the transmission housing. The engaging surface is disposed in opposition to the second blocking face in order to preclude withdrawal of the solenoid valve assembly from the receptacle when the stop means engages the first blocking face.

Finally, a latching means is presented from the retention means, and a third blocking face is presented from the transmission housing. Engagement, or opposition, of the latching means with the third blocking face normally precludes retro-rotation of the solenoid valve assembly within the receptacle when the stop means engages the first blocking face.

A biasing means permits selective displacement of at least the latching means out of operative engagement with all blocking surfaces: (1) to permit that rotation of the solenoid valve assembly within the receptacle which transports the engaging surface presented from the retention means into opposition with the second blocking face in order to preclude withdrawal of the solenoid valve assembly from the receptacle, and conversely (2) to permit retro-rotation of the retention means within the receptacle which transports the engaging surface out of opposition with the second blocking surface in order to permit withdrawal of the solenoid valve assembly from the receptacle.

The structural configuration of one exemplary configuration of a locking mechanism, and a modification thereof, both embodying the concepts of the present invention, are shown by way of example in the accompanying drawings and are described in detail without attempting to show all of the various forms and modifications in which the invention might be embodied; the invention being measured by the appended claims and not by the details of the specification.

DESCRIPTION OF AN EXEMPLARY EMBODIMENT

One representative form of a locking mechanism embodying the concepts of the present invention is depicted in FIGS. 1-4 of the accompanying drawings and is designated generally by the numeral 10 thereon. Although the locking mechanism 10 may be adapted for use in other environments, the locking mechanism 10 has particular suitability for demountably securing solenoid valve assemblies to the walls of electrically controlled transmission housings.

Figure 1:
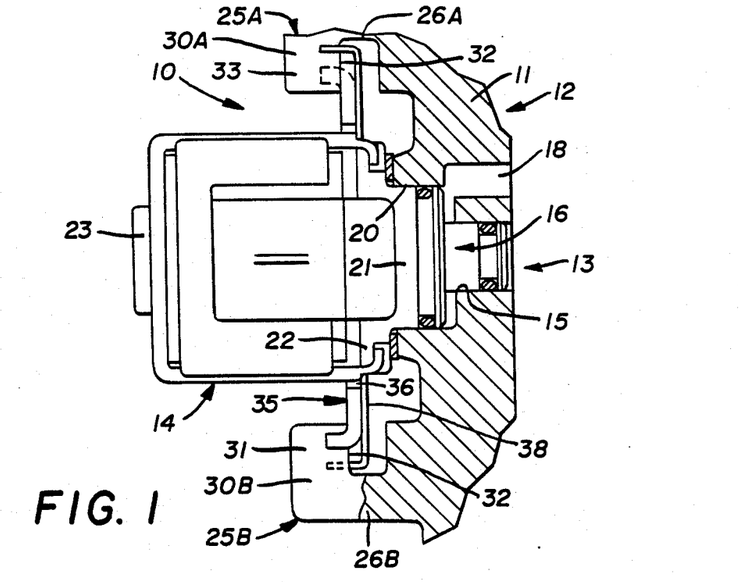
FIG. 1 is a side, elevational view of an exemplary embodiment for a locking mechanism embodying the concepts of the present invention and employed demountably to secure a solenoid valve assembly, also depicted in side elevation, within a receptacle in the wall of a transmission housing, that portion of the transmission housing which comprises a portion of the locking mechanism being represented in side elevation with the remaining portion of the transmission housing that is depicted being represented in section.

As best depicted in FIG. 1, the wall 11 of a transmission housing 12 is provided with a stepped receptacle 13 adapted operatively to receive a solenoid valve assembly 14. The stepped receptacle 13 presents a central aperture 15 within which a valve mechanism—indicated generally by the numeral 16, and forming a part of the solenoid valve assembly 14—is operatively received. The details of the valve mechanism 16 and its cooperative interaction with the various passages interiorly of the wall 11, a typical example of which is designated at 18, form no part of the present invention and are, in fact, so well known to the art that they are not described herein.

A recess 20 concentrically circumscribes the central aperture 15 to receive the neck portion 21 on the valve housing 22 of the solenoid assembly 14. The solenoid 23 itself is secured to the valve housing 22 by means well known to the art and will not, therefore, be described herein.

One or more pillars 25 are presented from the transmission housing 11, and the pillars 25 comprise a principal portion of the locking mechanism.

In the detailed description which follows, a particular structural member, component or arrangement may be employed at more than one location. When referring generally to that type of structural member, component or arrangement a common numerical designation shall be employed. However, when one of the structural members, components or arrangements so identified is to be individually identified, or referenced, it shall be designated by virtue of a letter suffix employed in combination with the numerical designation employed for general identification of that structural member, component or arrangement. Thus, there are at least two pillars which are generally identified by the numeral 25, but the specific, individual pillars are, therefore, identified as 25A and 25B in the specification and on the drawings. This same suffix convention shall be employed throughout the specification.

Continuing, then, with the detailed description of the invention, for most installations a pair of pillars 25A and 25B may be disposed in diametric opposition relative to the recess 20. As depicted in FIG. 1, each pillar 25 may have a pedestal portion 26 which is integrally formed with, and extends outwardly from, the wall 11 of the transmission housing 12 to terminate in an integral head portion 30 that is disposed in spaced relation outwardly from the wall 11 of the transmission housing 12. The head portions 30A and 30B of the respective pillars 25A and 25B preferably extend toward each other from their respective supporting pedestal portions 26A and 26B.

Each head portion 30 presents three blocking faces. The first blocking face 31 comprises one lateral wall of the head portion 30. The second blocking face 32 on each head portion 30 comprises the obverse wall thereof, and as such the second blocking face 32 opposingly faces the wall 11 of the transmission housing 12. The third blocking face 33 also comprises one lateral wall of the head portion 30. The third blocking face 33 is thus laterally spaced with respect to the first blocking face 31 and the first and third blocking faces 31 and 33, respectively, are thus disposed substantially perpendicularly with respect to the second blocking face 32.

A retention means 35, which also comprises a principal portion of the locking mechanism 10, is preferably secured within the solenoid valve assembly 14 in a relatively permanent manner. In the embodiment of the locking mechanism 10 depicted in FIGS. 1-4 the retention means 35 may embody a plate-like locating member 36 and a separate latching member 38.

Figures 3, 4:
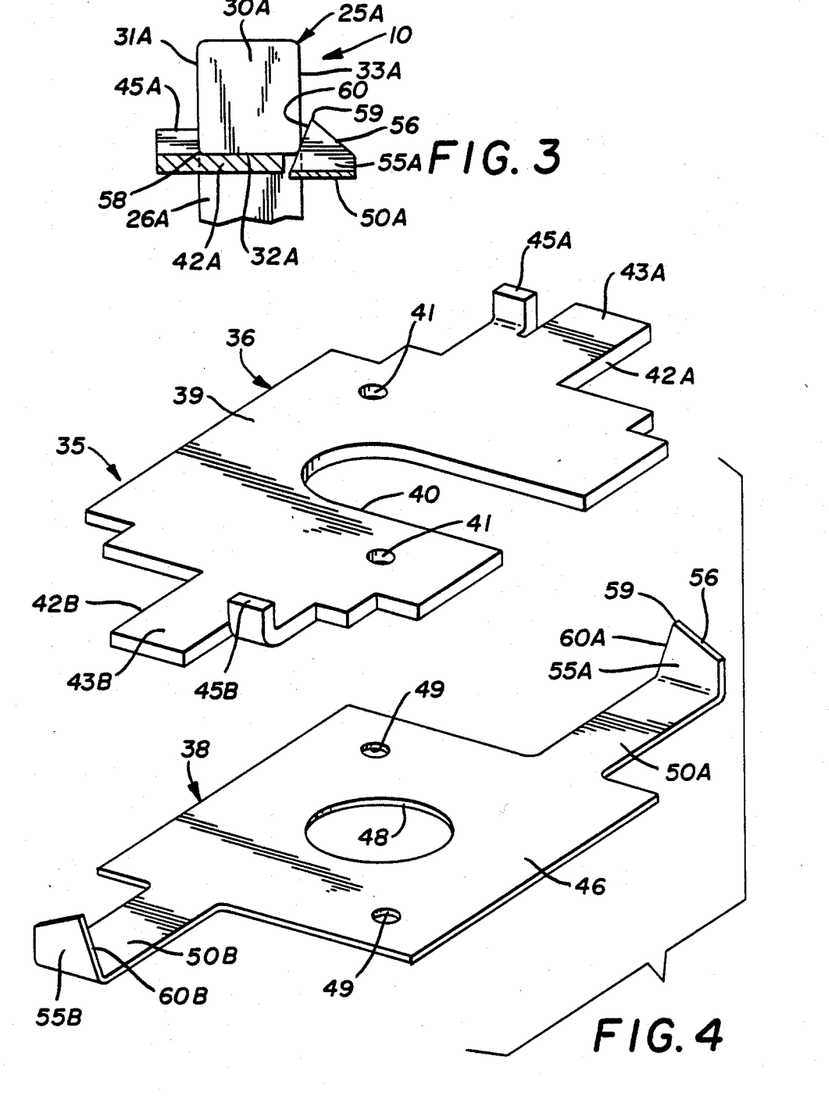
FIG. 3 is an enlarged, cross-sectional view taken substantially along line 3—3 of FIG. 2 to depict the relationship between that portion of the locking mechanism carried on the solenoid valve assembly as it cooperatively interacts with that portion of the locking mechanism presented from the transmission housing to secure the solenoid valve assembly within the receptacle.
FIG. 4 is an exploded perspective of that portion of the retention means presented from the solenoid valve assembly and employed in that form of the invention depicted in FIGS. 1-3 and comprising a locating member and a latching member.

As best depicted in FIG. 4, the locating member 36 has a hub portion 39 which may be notched, as at 40, to permit assembly within the solenoid valve assembly 14. In the alternative, the notch 40 can be replaced with a simple aperture. Bores 41 which penetrate the hub portion 39 of the locating member 36 are used to assure accurate radial location within the solenoid valve assembly 14.

When secured within the solenoid valve assembly 14, the diametrically opposed arms 42A and 42B on the locating member 36 extend radially outwardly relative to the solenoid frame 22 to present engaging surfaces 43A and 43B in proximity to the radially outer extremity of each arm 42A and 42B, respectively. The engaging surfaces 43A and 43B can, by selective rotation of the solenoid valve assembly 14 with the locating member 36 secured thereto, be selectively disposed in opposing juxtaposition with respect to the corresponding second blocking faces 32A and 32B on the head portions 30A and 30B of the pillar means 25A and 25B, respectively.

A stop lug 45 extends perpendicularly outwardly from one lateral edge of each engaging surface 43A and 43B on the locating member 36. Engagement of the stop lug 45A with the first blocking face 31A on the head portion 30A of pillar means 25A simultaneously with engagement of the stop lug 45B with the first blocking face 31B on the head portion 30B of pillar means 25B determines the extent to which the locating member 36 can be rotated, in one direction, when the solenoid valve assembly 14 is received within the receptacle 13.

Figure 2:
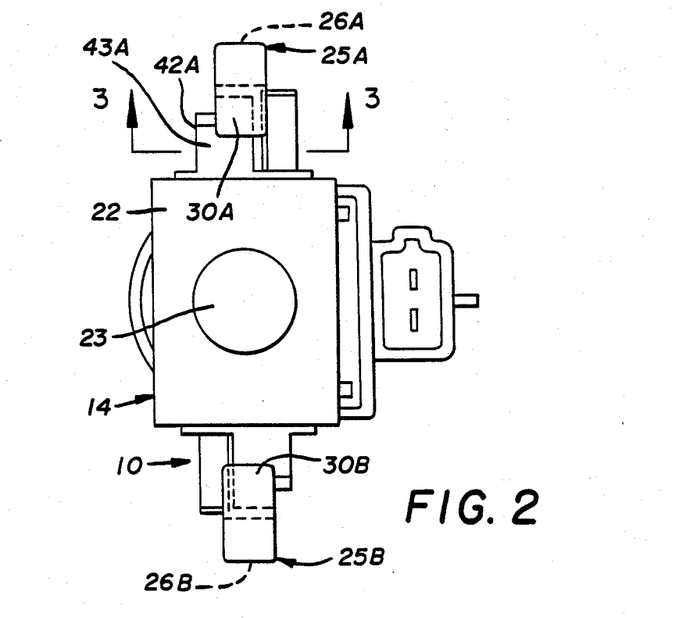
FIG. 2 is an end, elevational view of the embodiment shown in FIG. 1.

As viewed in FIGS. 2 and 4, the stop lugs 45A and 45B are located on the diagonally opposite edges of the engaging surfaces 43A and 3B, respectively, and when disposed as depicted the lugs 45 determine the extent to which the solenoid valve assembly 14 can be rotated (in a clockwise direction as viewed).

The latching member 38 is likewise disposed transversely relatively to the valve housing 22, and the latching member 38 is also preferably secured within the solenoid valve assembly 14 in a relatively permanent manner. Specifically, the latching member 38, as best depicted in FIG. 4, may also have a hub portion 46 which has a suitable aperture 48 to accommodate assembly. Bores 49 which penetrate the hub portion 46 of the latching member 38 are used to assure accurate radial location within the solenoid valve assembly 14. When secured to the solenoid assembly 14, the diametrically opposed fingers 50A and 50B on the latching member 38 extend radially outwardly relative to the valve housing 22.

Each finger 50 comprises a cantilevered spring which terminates in a latching dog 55 which extends perpendicularly outwardly from the radially outermost extremity of each finger 50 selectively, and operably, to interact with the third blocking face 33 on the head portion 30 of each pillar 25 to prevent retro-rotation of the solenoid assembly 14 when the latching dog 55 has operably engaged the third blocking face 33.

In order to effect automatic locking and facilitate unlocking, the latching dogs 55 must be capable of being displaced out of operative engagement with each blocking face 32, 32 and 33 on the head portion 30 of the appropriate pillar 25. In the embodiment depicted in FIGS. 1–4 the biasing action of at least one spring finger 50 not only urges the latching dog 55 carried thereon into operative, locking interaction with the third blocking face 33 on the head portion 30 of the appropriate pillar 25 but also permits the required selective displacement of the latching dog 55 necessary to move the latching dog 55 out of operative engagement with the first and third blocking faces 31 and 33, respectively, on the head portion 30 of each such pillar 25.

To effect the required displacement of the latching dogs 55 when the solenoid assembly 14 is rotated to actuate the locking mechanism 10, a camming ramp 56 may be incorporated as the leading edge on each latching dog 55. The camming ramps 56 are disposed such that rotation (clockwise as viewed in FIG. 2) of the solenoid frame 22 drives the camming ramp 56 against the striker edge 58 which defines the intersection between the first and second blocking faces 31 and 33, respectively, on the head portion 30 of each pillar 25. Continued rotation of the solenoid frame 22 displaces each latching dog 55 so that it may pass beneath the second blocking face 32 on the head portion 30 of each pillar 25. The apex 59 of the latching lug 55 will slide across the second blocking face 32, but such contact does not impair rotation of the solenoid valve assembly 14.

When the stop lugs 45A and 45B engage the first blocking face 31A and 31B on the head portion 30A and 30B of the appropriate pillar 25A and 25B, the biasing action of the fingers 50A and 50B urges the latching dogs 55A and 55B to translate such that blocking surfaces incorporated as the trailing edges 60A and 60B on the latching dogs 55A and 55B opposingly interact with the third blocking faces 33A and 33B. As best seen in FIG. 3, the trailing edge 60A of the latching-dog 55A may be angularly inclined. Were both the trailing edges 60 disposed perpendicularly with respect to the fingers 50, the trailing edges 60 would engage the third blocking face 33 on each pillar 25 to preclude retro-rotation of the solenoid valve assembly 14. However, when the trailing edges 60 are each inclined, as depicted by the trailing edge 60A in FIG. 3, they will each engage the third blocking face 33 at its intersection with the second blocking face 32. As such, the inclination of the trailing edge 60 must be such that it can not serve as a cam. This is imperative inasmuch as the purpose of the latching dog 55 is to preclude retro-rotation of the solenoid valve assembly 14 when the latching dog 55 operatively interacts with any part of the third blocking face 33, including just that portion of the third blocking face 33 which intersects the second blocking face 32 and to maintain contact between stop lugs 45 and blocking faces 31. As an alternative structure, one of the trailing edges; i.e., 60A, can be disposed perpendicular with respect to the fingers 50 and thereby provide a positive retention structure.

In order to effect removal of the solenoid valve assembly 14 it is necessary that the latching dogs 55 be capable of being selectively displaced operatively to disengage from the appropriate third blocking face 33. By mounting each latching lug 55 on the outboard end of cantilevered spring finger 50 one may selectively displace the latching lugs 55 out of operative interaction with the third blocking faces 33 such that the solenoid valve assembly 14 may be retro-rotated. Certainly as the solenoid valve assembly 14 is retro-rotated the apex 59 on each latching lug 55 will slide across one of the second blocking faces 32, but that contact will not preclude retro-rotation of the solenoid valve assembly 14, and once the engaging surfaces 43, and the latching dogs 55, clear the second blocking faces 32, the solenoid valve assembly 14 may be withdrawn from the receptacle 13.

ALTERNATIVE EMBODIMENT

Figure 5:
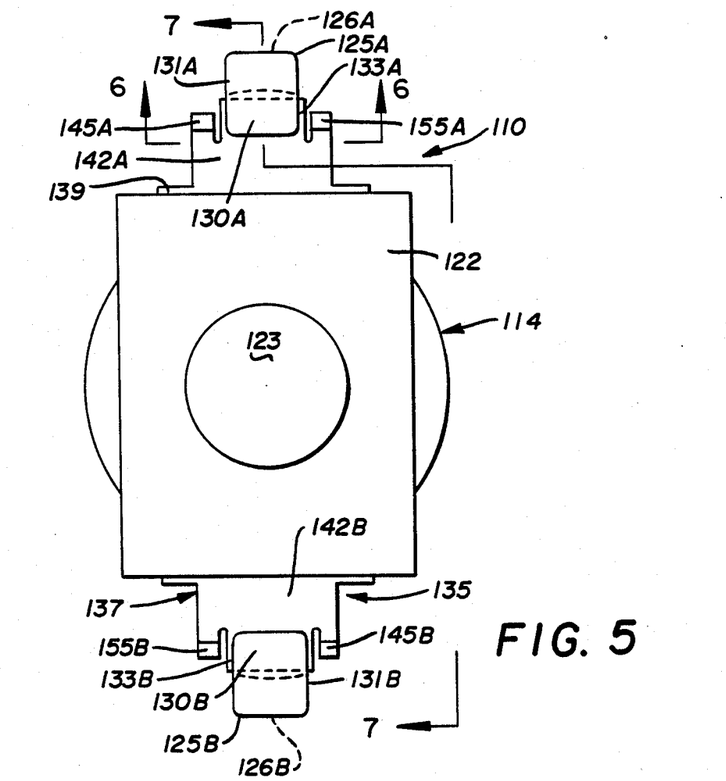
FIG. 5 is a view similar to FIG. 2, though enlarged, depicting an alternative form of a locking mechanism embodying the concepts of the present invention.
Figure 6:
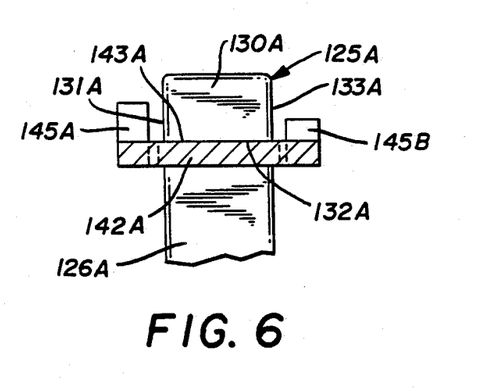
FIG. 6 is a further enlarged section taken substantially along line 6—6 of FIG. 5 to depict the relationship between that portion of the locking mechanism carried on the solenoid valve assembly as it cooperatively interacts with that portion of the locking mechanism presented from the transmission housing to secure the solenoid valve assembly within the receptacle; and, FIG. 7 is a side, elevational view, partly in section, of the alternative embodiment depicted in FIGS. 5 and 6 employed demountably to secure a solenoid valve assembly, also depicted in side elevation, within a receptacle in a transmission housing.
Figure 7:
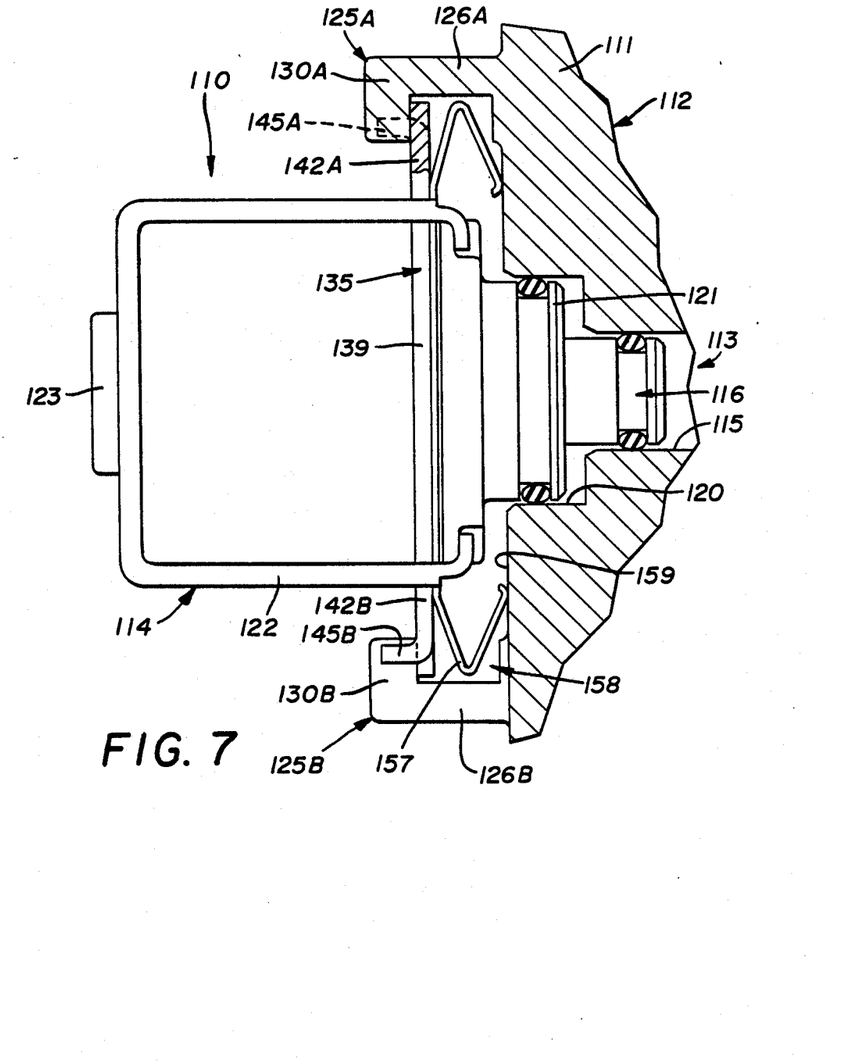

Referring now to FIGS. 5–7 an alternative embodiment of the locking mechanism 110 is depicted. As best depicted in FIG. 7, the wall 111 of a transmission housing 112 is provided with a stepped receptacle 113 adapted operatively to receive a solenoid valve assembly 114. The stepped receptacle 113 presents a central aperture 115 within which a valve mechanism—indicated generally by the numeral 116, and forming a part of the solenoid valve assembly 114—is operatively received. As with the first embodiment described herein, the details of the valve mechanism 116 and its cooperative interaction with the interior of the transmission housing 112 as well as with the various passages (not shown) interiorly of wall 111 form no part of the present invention and, in fact, are so well known to the art that they are not described herein.

A recess 120 concentrically circumscribes the central aperture 115 to receive the neck portion 121 on the valve housing 122 of the solenoid assembly 114. The solenoid 123 itself is secured within the frame 122 by means well known to the art and will not, therefore, be described herein.

As with the previously described embodiment, one or more pillars 125 are presented from the wall 111 of the transmission housing 112, and the pillars 125 also comprise a principal portion of the locking mechanism 110.

For most installations a pair of pillars 125A and 125B may be disposed in diametric opposition relative to the receptacle 113. Each pillar 125A and 125B may have a pedestal portion 126 which extends outwardly from the wall 111 of the transmission housing 112 to terminate in a head portion 130 that is disposed in spaced relation outwardly from the wall 111 of the transmission housing 112.

The head portions 130A and 130B of the respective pillars 125A and 125B preferably extend toward each other from their respective supporting pedestal portions 126A and 126B.

Each head portion 130 presents three blocking faces. The first blocking face 131 comprises one lateral wall of the head portion 130. The second blocking face 132 on each head portion 130 comprises the obverse wall thereof, and as such the second blocking face 132 opposingly faces the wall 111 of the transmission housing 112. The third blocking face 133 also comprises one lateral wall of the head portion 130. The third blocking face 133 is thus laterally spaced with respect to the first blocking face 131 and the first and third blocking faces 131 and 133, respectively, are thus disposed substantially perpendicularly with respect to the second blocking face 132.

A retention means 135, which comprises a principal portion of the locking mechanism 110, is preferably secured within the solenoid valve assembly 114 in a relatively permanent manner. In the embodiment of the locking mechanism 110 depicted in FIGS. 5-7 the retention means 135 may comprise a single locking member 137 and a spring 157.

The locking member 137 has a hub portion 139 which is provided with a suitable opening (not shown) to permit assembly within the solenoid valve assembly 114.

When secured within the solenoid assembly 114, the diametrically opposed arms 142A and 142B on the locking member 137 extend radially outwardly relative to the valve housing 122 to present engaging surfaces 143A and 143B in proximity to the radially outer extremity of each arm 142A and 142B, respectively. The engaging surfaces 143A and 143B can, by selective rotation of the solenoid valve assembly 114 with the locking member 137 secured thereto, be selectively disposed in opposing juxtaposition with respect to the second blocking faces 132A and 132B on the head portions 130A and 130B of the respective pillar means 125A and 125B.

Stop lugs 145A and 145B extend perpendicularly outwardly from one lateral edge of the respective engaging surfaces 143A and 143B on the locking member 137 to engage the first blocking faces 131A and 131B on the head portion 130 of each pillar means 125A and 125B and thereby determine the extent to which the solenoid valve assembly 114 can be rotated, in one direction. As viewed in FIG. 6, the stop lugs 145A and 145B are located on the diagonally opposite edges of the engaging surfaces 143A and 143B, respectively, and when disposed as depicted the lugs 145 determine the extent which the solenoid assembly 114 can be rotated in a clockwise direction.

Latching dogs 155A and 155B extend perpendicularly outwardly from the opposite lateral edges of the respective engaging surfaces 143A and 143B on locking member 137. The latching dogs 155 are located in laterally spaced relation with respect to the stop lugs 145 and thus on the opposite side of the engaging surfaces 143. Each latching dog 155 is adapted, and located, selectively to engage the third blocking face 133 on the head portion 130 of each pillar 125 to prevent retro-rotation of the solenoid assembly 114 when the latching dog 155 is disposed in opposition to the third blocking face 133.

In order to effect selective locking and unlocking, of the locking mechanism 110, the latching dogs 155 must be permitted to be displaced against the biasing action of the spring means 157 to allow the latching dog 155 to pass unrestricted past the pillar means 125.

The spring 157 is received within a space 158 which circumscribes the recess 120 and is interposed between the locking member 137 and the surface 159 of the space 158 biasingly to urge the solenoid valve assembly 114 axially outwardly of the receptacle 113. The opposed juxtaposition of the engaging surfaces 143 with the second blocking face 132 on the head portion 130 of each pillar 125 secures the solenoid valve assembly 114 within the receptacle 113.

In order to mount the solenoid valve assembly 114 it is necessary that the latching dogs 155 be capable of being selectively displaced operatively to clear the first blocking face 131 on each pillar 125 and permit the solenoid valve assembly 114 to be rotated until the stop lug 145 engages the first blocking face 131. Conversely, in order to effect removal of the solenoid valve assembly 114 it is also necessary that the latching dogs 155 be capable of being selectively displaced operatively to disengage from the third blocking face 33 so the solenoid valve assembly 114 may be retro-rotated sufficiently for the engaging surfaces 143 and the latching dogs 155 to clear the pillars 125. By employing the spring 157 the entire solenoid valve assembly 114 may be displaced axially inwardly a sufficient distance to displace the latching lugs 155 out of operative engagement with the head portion 130 of each pillar 125 such that the solenoid valve assembly 14 may be rotated to secure it in operative position in the receptacle or retro-rotated to effect withdrawal thereof.

As should now be apparent, a locking mechanism embodying the concepts of the present invention not only provides a novel and unique means which can be readily and easily employed demountably to secure a solenoid valve assembly to the housing of a transmission but also accomplishes the other objects of the invention.

The embodiments of the invention in which an exclusive property or privilege is claimed are defined as follows:

1. A locking mechanism for demountably securing a solenoid valve assembly within a receptacle in the wall of a transmission housing, said locking mechanism comprising: retention means presented from the solenoid valve assembly; a stop means presented from said retention means; a first blocking face presented from said transmission housing; rotation of the solenoid housing within the receptacle being limited by engagement of said stop means with said first blocking face; an engaging surface presented from said retention means; a second blocking face presented from the transmission housing; said engaging surface being disposed in opposition with said second blocking face to preclude withdrawal of the solenoid assembly from the receptacle when said stop means engages said first blocking face; latching means presented from said retention means; a third blocking face presented from the transmission housing; engagement of said latching means with said third blocking face normally precluding retro-rotation of the solenoid assembly within the receptacle when said stop means engages said first blocking face; biasing means to permit selective displacement of at least said latching means to permit selective rotation, and retro-rotation, of the solenoid valve assembly within the receptacle and thereby transport said engaging surface into, and out of, opposition with said second blocking face to permit mounting, and demounting, of the solenoid valve assembly with respect to the receptacle.

2. A locking mechanism for demountably securing a solenoid valve assembly within a receptacle in the wall of a transmission housing, as set forth in claim 1, wherein: said biasing means employs at least one spring finger; said latching means is carried on said spring fingers; camming ramp means are provided on said latching means; a striker is presented from the transmission housing; engagement of said camming ramp means with said striker effecting displacement of said latching means upon rotation of the solenoid assembly sufficiently to permit said latching means to clear said first and second blocking faces until said stop means engages said first blocking face and said latching means engages said third blocking face.

3. A locking mechanism for demountably securing a solenoid valve assembly within a receptacle in the wall of a transmission housing, as set forth in claim 1, wherein: said first and third blocking faces are presented from a common pillar means and are laterally spaced with said second blocking face extending generally perpendicularly therebetween; said retention means is a locking plate; said stop means and said latch means are presented from said locking plate and are laterally spaced with respect to said engaging surface and are thereby adapted to embrace said first and third blocking faces on said pillar means; said biasing means is a spring, said spring permitting selected translation of said rigid plate relative to the receptacle.

4. A locking mechanism for demountably securing a solenoid valve assembly within a receptacle in the wall of a transmission housing, said locking mechanism comprising: pillar means presented from the wall of the transmission housing adjacent to said receptacle; said pillar means having a pedestal portion and a head portion; first, second and third blocking faces presented from said head portion; said first and third blocking faces being laterally spaced with said second blocking face being perpendicularly disposed between said first and third blocking faces and in spaced opposition to said receptacle; retention means secured to the solenoid assembly; an engaging surface presented from said retention means such that selected rotation of said solenoid assembly will position said engaging surface in opposition to said second blocking face on the head portion of said pillar means in order to preclude axial displacement of said solenoid assembly outwardly from the receptacle; a stop lug presented from said retention means to engage said first lateral blocking face to determine the maximum rotation of said retention means relative to said pillar means and thereby locate said engaging surface in opposition to said second blocking face on the head portion of said pillar means; a latching dog presented from said retention means to engage said third blocking face and preclude counter-rotation of said retention means when said stop lug has engaged said first lateral blocking face; and, biasing means to permit selective displacement of at least said latching dog such that said latching dog can be counter-rotated beneath the head portion of said pillar means.

5. A locking mechanism for demountably securing a solenoid valve assembly operatively within a receptacle in the wall of a transmission housing, said locking mechanism comprising: at least one pillar means located adjacent said receptacle; first, second and third blocking faces presented from said head portion; said first and third blocking faces being laterally spaced with said second blocking face being perpendicularly disposed between said first and third blocking faces and in spaced opposition to said receptacle; retention means secured to the solenoid assembly; a retention means presented from said solenoid assembly; said retention means incorporating a locating member secured to, and extending radially from, the solenoid assembly; at least one engaging surface presented from said locating member; rotation of said solenoid valve assembly within said receptacle selectively positioning said engaging surface in opposition to said second blocking surface; a stop lug extending outwardly from said engaging surface to engage said first blocking face on said pillar means and limit rotation of said locating member; said retention means also incorporating a latching member secured to, and extending outwardly from, said solenoid assembly; a cantilevered, spring finger presented from said latching member; a latching dog presented from said spring finger to engage said third blocking face on said pillar means when said stop lug engages said first blocking face; camming ramp means presented from said latching dog to interact with said pillar means and thereby displace said latching dog out of engagement with said pillar means in response to rotation of said solenoid valve assembly in one direction; and, engagement of said latching dog with said third blocking face on said pillar means precluding retro-rotation of said solenoid assembly.

6. A locking mechanism for demountably securing a solenoid valve assembly within a receptacle in the wall of a transmission housing, said locking mechanism comprising: pillar means presented from the wall of the transmission housing in juxtaposition to said receptacle; said pillar means having a pedestal portion and a head portion; first, second and third blocking faces presented from said head portion; said first and third blocking faces being laterally spaced with said second blocking face being perpendicularly disposed between said first and third blocking faces and in spaced opposition to said receptacle; a plate-like locking member: at least one engaging surface presented from said plate-like locking member; a stop lug extending outwardly from said locking member; a latching dog extending outwardly from said locking member; said stop lug and said latching dog being laterally spaced with said engaging surface disposed therebetween; biasing means to urge said engaging means against said second blocking face and to permit selective displacement of said locking member to separate said engaging means from said second blocking face and permit selective rotation, or retro-rotation, of said retention means with said latching dog passing said pillar means without engagement therewith.

* * * * *

UNITED STATES PATENT AND TRADEMARK OFFICE
CERTIFICATE OF CORRECTION

PATENT NO. : 4,842,010

DATED : June 27, 1989

INVENTOR(S) : Robert K. Edgecomb, et al.

It is certified that error appears in the above-identified patent and that said Letters Patent is hereby corrected as shown below:

Item [73]:

Add on face of patent: -- Assignee: Ford Motor Company, Dearborn, Michigan --

Signed and Sealed this

Third Day of September, 1991

Attest:

HARRY F. MANBECK, JR.

Attesting Officer

Commissioner of Patents and Trademarks